(No Model.)  7 Sheets—Sheet 1.

J. D. BUTLER.
LOOM.

No. 303,618.  Patented Aug. 19, 1884.

Fig. 1.

Witnesses.
Fred A. Powell,
John F. C. Prinkert

Inventor:
James D. Butler.
by Crosby & Gregory
Attys

(No Model.) 7 Sheets—Sheet 2.

J. D. BUTLER.
LOOM.

No. 303,618. Patented Aug. 19, 1884.

Witnesses,
Fred A. Powell
John F. C. Preinkert

Inventor
James D. Butler.
by Crosby & Gregory
attys (No Model.) 7 Sheets—Sheet 4.

J. D. BUTLER.
LOOM.

No. 303,618. Patented Aug. 19, 1884.

Witnesses.
Fred A. Powell,
John F. C. Preinkert

Inventor
James D. Butler
by Crosby & Gregory
attys.

(No Model.)  7 Sheets—Sheet 6.

J. D. BUTLER.
LOOM.

No. 303,618.  Patented Aug. 19, 1884.

Witnesses.
Fred A. Powell.
John F. C. Reinhart.

Inventor.
James D. Butler
by Crosby & Gregory
atty's.

N. PETERS, Photo-Lithographer, Washington, D. C.

(No Model.) 7 Sheets—Sheet 7.
J. D. BUTLER.
LOOM.
No. 303,618. Patented Aug. 19, 1884.

Fig. 22.

UNITED STATES PATENT OFFICE.

JAMES D. BUTLER, OF MANCHESTER, NEW HAMPSHIRE.

LOOM.

SPECIFICATION forming part of Letters Patent No. 303,618, dated August 19, 1884.

Application filed October 11, 1882. Renewed July 19, 1884. (No model.)

*To all whom it may concern:*

Be it known that I, JAMES D. BUTLER, of Manchester, county of Hillsborough, State of New Hampshire, have invented an Improvement in Looms, of which following description, in connection with the accompanying drawings, is a specification.

My invention in looms consists in improvements in mechanism for operating the change shuttle-boxes positively, and for holding the same in position while the shuttles are being picked; also in improvements in the pattern mechanism for the change shuttle-box mechanism; also in improvements in the lay and its guides for the change shuttle-boxes, and means for bracing and adjusting the said guides, whereby they are prevented from being twisted out of shape or from sagging, as will be described; also in improvements in protector or stop-motion mechanism, whereby the shuttle is prevented from getting into and breaking the warp-threads, as will be hereinafter more fully described, and pointed out in the claims at the end of the specification.

Fig. 3$^a$ is a sectional detail of the pattern mechanism or plate, and the plate $h^9$ below it. Fig. 15, a plan and side elevation of the ratchet-lever, to be referred to; Fig. 17, details of the arm J$^9$, to be referred to; Fig. 20, details of the mechanism for locking and releasing the segmental heads; Fig. 21, details of the lever J$^5$, to be referred to.

In the several figures like letters indicate like parts.

Figure 1:
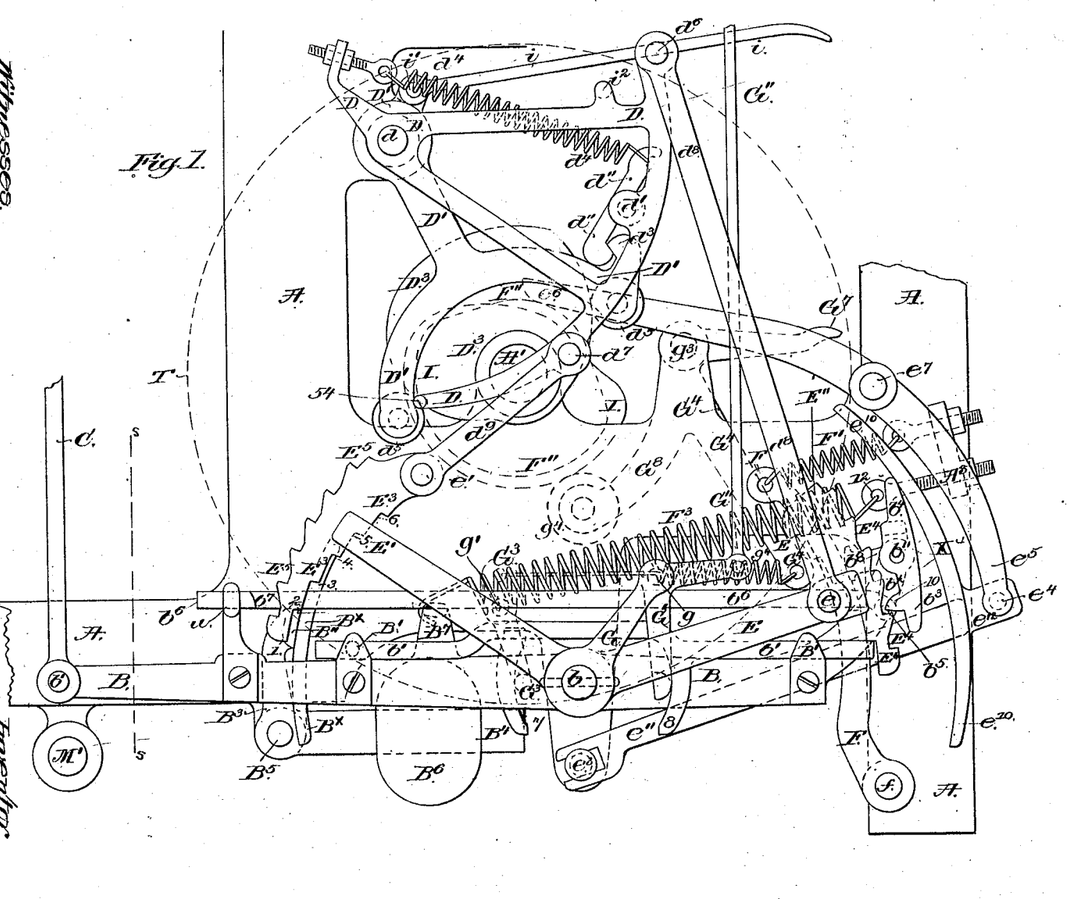
Figure 1 is a view in side elevation of a sufficient portion of a loom, from a point a little below the crank-shaft, to represent my improvements in shuttle-box operating mechanism.
Figure 2:
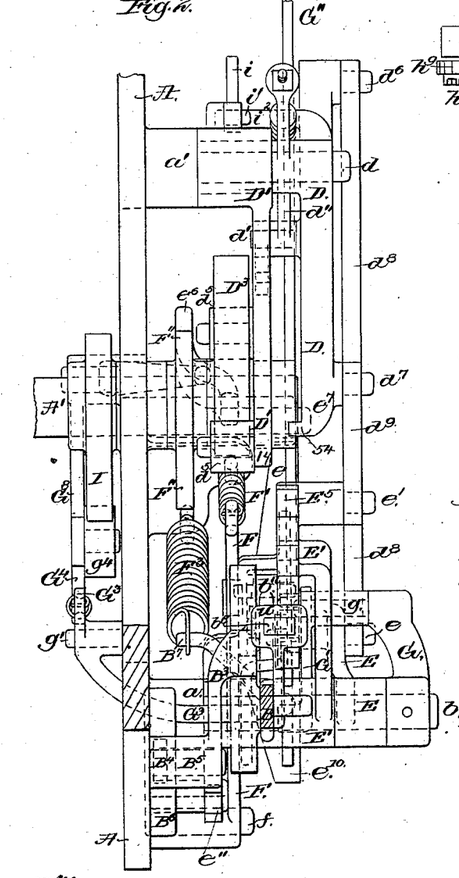
Fig. 2, a section of Fig. 1 on the line S S, looking toward the right.
Figures 3, 5:
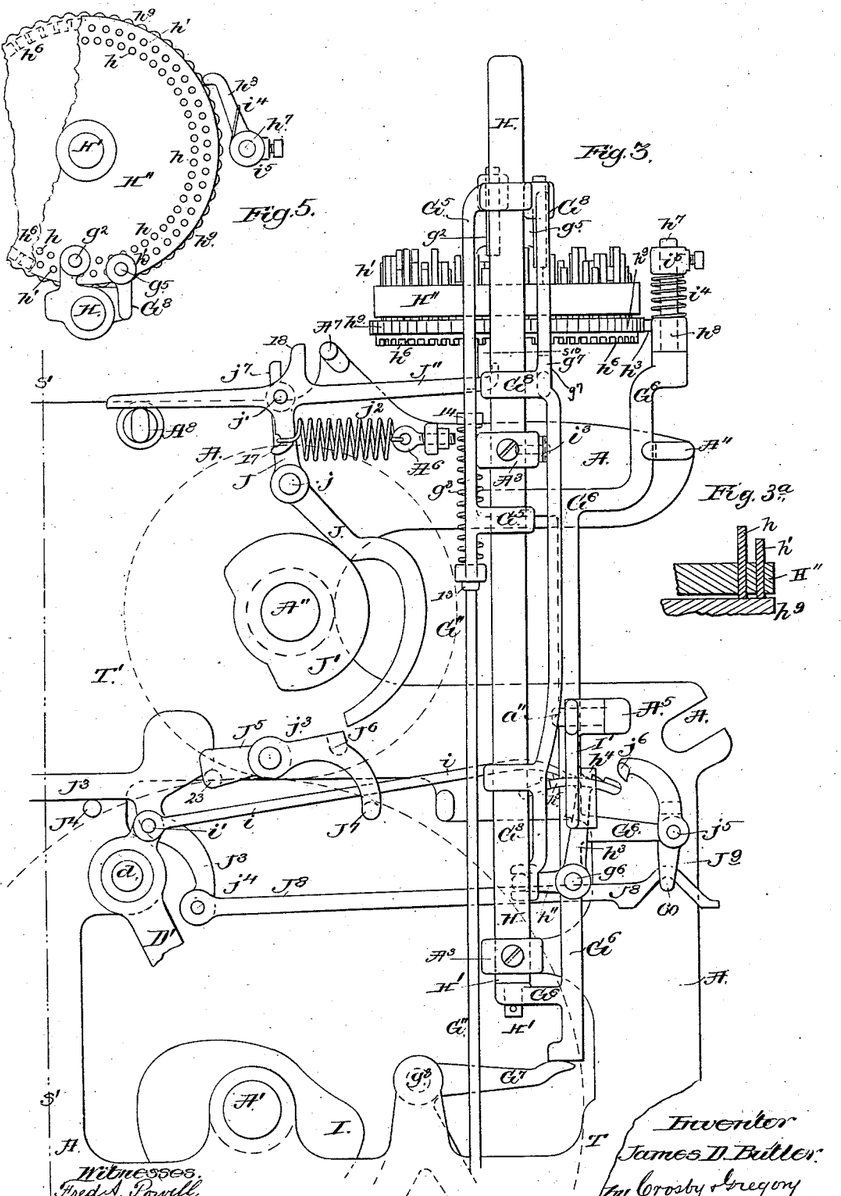
Fig. 3 is an end elevation of most of the upper portion of my improved loom, sufficient to show the pattern mechanism and the means for operating it, which were omitted from Fig. 1 because of lack of space on the drawings, Figs. 1 and 3 together showing the most of one end of the loom, each figure having, however, some devices common to both.
Fig. 5 is a partial broken plan view of the pattern-surface and some of its co-operating devices, to be described.

A is part of the loom side; A', the main cam-shaft, and A'' the crank-shaft, the latter driving the former by the gears T T', partially shown in dotted lines in Fig. 3. The hub $a$, forming part of the loom side, has a stud, $b$, which supports the shuttle-box lever B, connected at its front end by stud $b'$ with the box-rod C, (shown in Figs. 1 and 6,) the said rod being attached to the change shuttle-boxes by the pin C'. The stud $d$, fast upon hub $a'$ on the loom side, (see Fig. 2,) supports the swinging frame D, provided with a sleeve-like hub which receives upon it the hollow hub of the arm D'. The swinging frame D has a fixed stud, $d'$, which supports a hook, $d''$, that normally engages a tooth, $d^3$, at one end of the arm D', thus forming a connection between the said swinging frame and arm D D', so that they swing together so long as the hook $d''$ is pressed against the tooth $d^3$ by the spring $d^4$, which is connected with the said hook and with an ear at the upper end of the frame D. The arm D' has suitable rolls, $d^5$, to bear upon the cam $D^3$, fast upon the main cam-shaft A', the rotation of the cam swinging the arm D' and frame D in unison so long as the hook $d''$ engages tooth $d^3$, referred to. The frame D has two studs, $d^6$ and $d^7$, for the two connecting-rods $d^8$ and $d^9$, which are joined, respectively, with the studs $e$ and $e'$, fast upon the arm E and a segmental head, $E^3$, of the arm E', the said arms being loose upon the stud $b$ at the side of the shuttle-box lever B.

Figure 18:
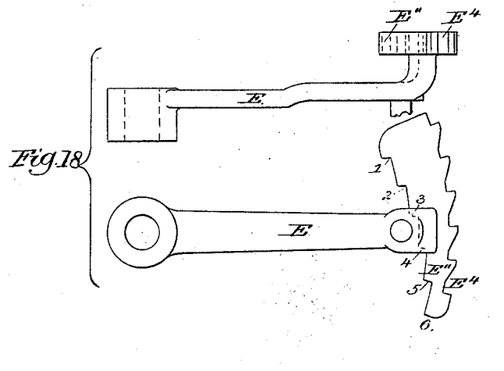
Fig. 18, details of the segmental arms.

The arms E and E' are worked by the rods $d^8$ and $d^9$. The arm E has a segmental head, E'', and arm E', a segmental head, $E^3$, each head being set off at one side of the arm, as in Figs. 2 and 18, and being provided with a series of steps, the lower end of each head forming one of the said steps, the steps being in number to correspond with the number of cells in the series of shuttle-boxes employed. In the present instance there are six cells, and consequently six steps or shoulders; and in the drawings I have designated the said steps as 1 2 3 4 5 6, each step representing by its number the cell of the series of shuttle-boxes, counting from the top, which will be in line with the shuttle-race of the lay M when such shoulders are engaged by the sliding bar $b'$, held in bearings B' upon the shuttle-box lever B. The steps on the head E'' are numbered upward, and those on head $E^3$ downward. The bar $b'$ has two arms, 7 8. (Shown in Fig. 1.) The arm 8 is acted upon by one arm of an elbow-lever, G', having its fulcrum at $g$, on arm G, fixed on stud $b$, and joined at its upper end, by connecting-rod G'', with the sliding frame $G^5$, to be hereinafter described, the said lever G' being vibrated at the proper times to move the sliding bar $b'$, as herein shown, in a direction away from the front of the loom, the said bar being moved in the opposite direction as far as the lever G' will allow, by a lever, $g^3$, (see Figs. 1 and 2,) mounted loosely on a fixed stud, $g'$, the said arm being held by a spring, $g''$, herein shown as connected with one arm of a lever, $G^4$, pivoted at $g^3$ upon an ear of the loom side.

Figure 19:
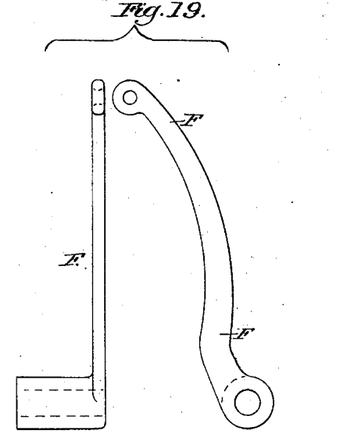
Fig. 19, details of the lever F.
Figures 20, 21:
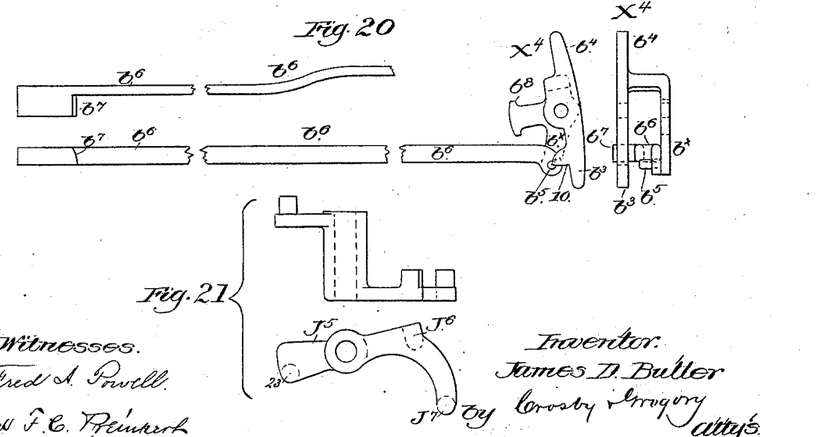
Figure 22:
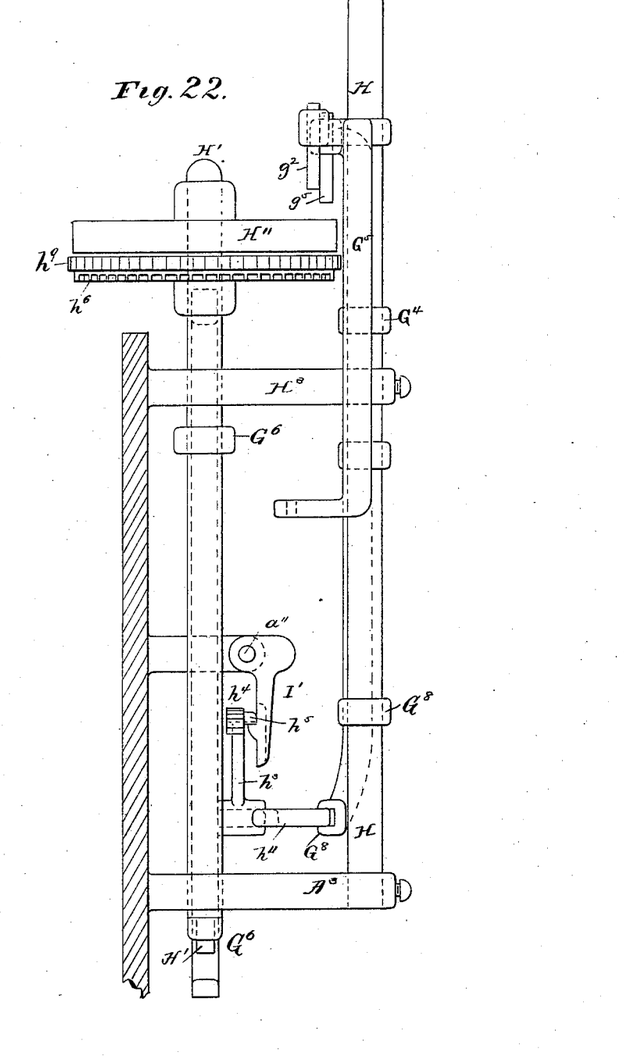
Fig. 22 is a view in detail corresponding with Fig. 4, but containing only the pattern-disk and its shaft, the frames G$^5$ and G$^8$, and the appurtenances of said frame G$^5$.

The spring $g''$ may, if desired, be attached to a fixed stud on the loom side, instead of to the arm of the lever $G^4$, as shown. The advantage in attaching the spring to the lever $G^4$ is that as this lever swings toward the front of the loom it relieves the strain upon the said spring, so that it shall not press the end of the bar $b'$ against the steps 1, 2, 3, &c., of the segmental head $E^3$ of the arm E' as said head is moving upward. In this way the bar is kept from clicking upon the steps 1, 2, 3, &c., during the upward stroke of the said head. After this head has reached the upward extremity of its stroke, the swinging of the lever $G^4$ toward the back of the loom strains the spring $g''$, so that the bar $b'$ is brought to its place against the steps of the segmental head $E^3$. The segmental heads E'' and $E^3$ are moved downward and then upward in unison by the cam $D^3$, which is so shaped as to impart to the segmental heads a movement the rate of which, toward the end of each stroke, is gradually diminished. The said heads are effective in moving the shuttle-box lever only during their downward motion, and consequently the shuttle-box rod is raised or lowered positively in accordance with which of the heads first engages the sliding bar $b'$, the box-rod being raised when the head E'' is first engaged, and lowered when the head $E^3$ is first engaged. During their downward movements one of the steps on one of the segmental heads will be met by one end of the bar $b'$, it having been placed in proper position by the pattern-surface, and, acting thereon, will turn the shuttle-box lever in unison with it about the pin $b$; and as these heads complete their movements, the other end of the bar will be met by that one of the steps of the other head which is designated by a figure like that designating the step on the other head already operating the shuttle-boxes; and as the cell of the shuttle-box which it is desired to use comes opposite the race of the lay, both heads will bear upon opposite ends of the slide-bar $b'$ and lock the shuttle-box lever temporarily in position. The different positions in which the shuttle-box lever is locked are such such as to bring the different cells of the change shuttle-boxes into line with the race-plate, and which one of these positions shall in any given case be taken by the lever depends upon how far one way or the other the bar $b'$ has been moved in its bearings B', since the place of the bar to the right or left determines which of the steps of one or the other of the segmental heads shall first come in contact with the bar $b'$. Whenever, from the catching of a shuttle, or from any other cause, the shuttle-box will not move as it ought, the hook $d''$, having an inclined face in contact with the tooth $d^3$, will partly or altogether uncatch, and thus avoid the breaking of the parts which would occur if the connections throughout were unyielding. Indeed, in the ordinary working of the loom, in order to cover slight irregularities, such as are found in the kind of workmanship which is put into looms, and be sure to have the steps of the segmental heads come fairly to a bearing on the two ends of the bar $b'$, it will be necessary to make the adjustment so that the catch $d''$ shall ordinarily yield a little. With the two segmental heads E'' and $E^3$ connected, by means of rigid rods $d^8$ and $d^9$, with the rigid swinging frame D, the pressure upon one end of the bar $b'$ cannot preponderate over the other and carry the said bar beyond the exact point where it should be locked at rest with the two segments, and when the catch $d''$ gives way it releases equally both the heads E'' and $E^3$. This feature, which brings the shuttle-boxes exactly into position, is of decided value in the working of the loom. When the shuttle-boxes are being shifted the end of the bar $b'$, and the step which it meets at the completion of its movement, will strike with a slam unless some provision is made to somewhat check the movement of the parts. Such provision I have herein made as follows, viz: At one end of the shuttle-box lever B is a pin, $b''$, upon which is placed a lever, $X^4$, having arms $b^3$, $b^4$, $b^8$, and $b^\times$. (See Fig. 20.) A pin, $b^5$, on the arm $b^\times$ of this lever connects it with a bar, $b^6$, having a spur, $b^7$, which bar at its front end moves in a slide, $u$, which is on the shuttle-box lever B. The arm $b^3$, referred to, has a spur, 10, which at proper times catches one of the series of notches $E^4$ on the outside of the head $E''$. The spur $b^7$ on the bar $b^6$, referred to, at the proper time catches one of the series of notches $E^5$ on the outside of head $E^3$. The lever F bears against the end of the arm $b^8$. This lever F (shown separately in Fig. 19) swings upon a stud, $f$, which is fastened to the loom side, and is drawn against the end of arm $b^8$ by the spring F'. Now, when the lever B begins to swing one way or the other, the drag of the arm $b^8$ upon the face of the lever F swings the lever having the arms $b^3$ $b^4$ about the pin $b''$, so as to move either the spur 10 or the spur $b^7$ into the notches $E^4$ or $E^5$, respectively. This catching of one of the spurs upon one or the other of the segmental heads prevents the lever B from going faster than the said heads, and makes the said lever stop as gradually as do the heads, according to the action of the cam $D^3$, as before described. The bearing of the upper one of the rolls $d^5$ of arm $D'$ upon the cam $D^3$ acts to hold the segmental heads back during their downward movement. When the downward stroke of the heads has been completed, it is necessary that that one of the spurs 10 or $b^7$ which is in engagement with one of the notches of one of the heads should be withdrawn before the upward stroke begins, so that the lever B shall be left in its new position until the proper time for another change of shuttle to take place.

Opposite to the face of the lever $X^4$ is the arc-shaped plate $e^{10}$, having the ear $e^{12}$ and the projecting arm $e''$. Through the ear $e^{12}$ passes the pin $e^4$, which is fast upon the lever $e^5$ $e^6$, pivoted at $e^7$. The forked end of arm $e''$ slides upon the pin $e^3$, which is fixed upon an ear of the loom side. The upper end, $e^6$, of the lever $e^5$ $e^6$ bears upon the cam F'', (shown in dotted lines, Fig. 1,) which is fast upon the main cam-shaft A', and of course turns with it. This cam is so set upon the shaft and is so shaped that when the downward stroke of the heads $E^2$ $E^3$ has been completed the end $e^6$ of the said lever will be raised and carry the arc-shaped plate $e^{10}$ to the left, and the latter, by its pressure against the face of the lever $X^4$, will positively turn and bring the latter into its middle position, notwithstanding the friction exerted between the lever F and the part $b^8$, holding the spurs 10 and $b^7$ both clear of the teeth $E^4$ and $E^5$ of the heads.

Fast upon the lever B is an arc-shaped plate, $B^\times$, upon which bears a friction brake or pad, B'', at the end of an arm, $B^3$, pivoted upon a stud, $B^5$, fast to the loom side. Connected with arm $B^3$ is another arm, $B^4$, provided with a movable weight, $B^6$, which acts to press the brake-pad B'' against the arc-shaped plate $B^\times$. The action of the brake or pad B'' is to steady the lever B as it swings, and to hold it in the position in which it is left by the shifting mechanism above described.

Figure 4:
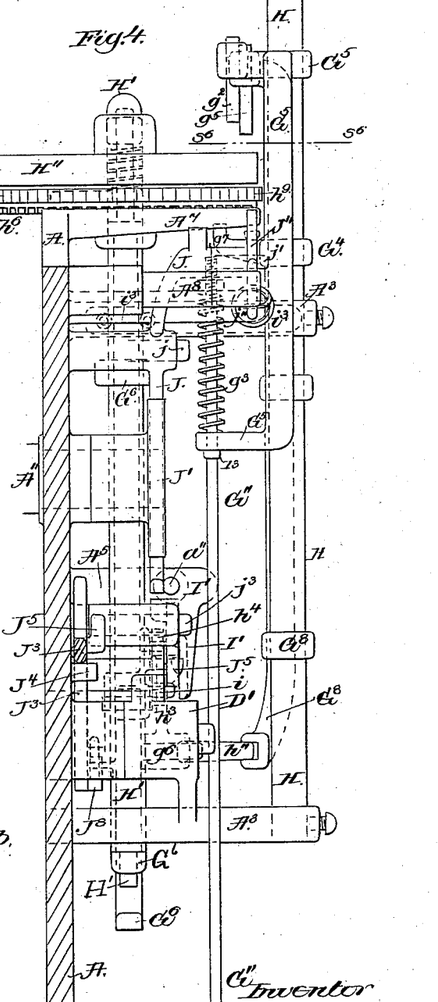
Fig. 4 is a view of the parts shown in Fig. 3, looking toward the right of the section-line S' S' of Fig. 3.

$F^3$ is a spring connecting the arm $B^7$ of the lever B and an eyebolt, 12, fastened to an ear, $A^3$, on the loom side, to counterbalance the weight of the shuttle-boxes. When the lever $G^4$, above described, is swung to the right, (see Fig. 1,) it, operating through the spring $g''$, presses the arm $G^3$ against the horn 7 of the bar $b'$, and tends to carry this bar to the left, drawing the other horn, 8, of the bar against the lever G'. The extent of the movement of the bar $b'$ to the left in Fig. 1, under the action of the lever $G^4$, spring $g''$, and lever $G^3$, and consequently the position to which the shuttle-boxes are subsequently moved, is determined by the position of the lever G', actuated by the rod G'', worked from the pattern mechanism, in a manner which will now be set forth. The rod G'' (see Figs. 3, 4, and 5) passes through an ear on a sliding frame, $G^5$. A collar, 13, on the rod G'' bears against the under side of the said ear and is kept there by the spring $g^3$, which is compressed by the nut 14 (see Fig. 3) on the top of the said rod. The spring $g^3$ is introduced to allow the rod G'' to yield whenever, in the working of the mechanism with which it is connected, anything catches. The two ears of the frame $G^5$ slide, but do not turn upon the rod H, which is fastened into the ears $A^3$, forming a part of the loom side. The shaft H', also guided in the ears $A^3$, has a rotary and also a lengthwise movement, and turns in ears in the frame $G^6$, (see Figs. 3 and 22,) which is kept from turning with the said shaft by an ear, $A^4$, (see Fig. 3,) on the loom side. The shaft H' is supported upon the lower ear of this frame $G^6$, a shoulder being turned on it, as shown.

Fastened to the top of the shaft H' is a pattern-disk, H'', in which are two rows of holes, which receive pattern wires or pins of different lengths, according to the pattern to be woven in the loom. Secured to the same shaft H', below the pattern-disk, is a plate or disk, $h^5$, having a series of teeth, $h^6$, and having at its periphery a series of teeth to co-operate with a detent, $h^8$. (See Figs. 3 and 5, to be described.) The disk $h^5$ supports the lower end of the said pins. These pins are omitted in Fig. 4, but fully shown in some of the other figures. In the frame $G^5$ a pin, $g^2$, is fastened. This pin is placed just over and in the line of the inner circle of pattern-pins $h$ in the disk H'', and as the disk is revolved the different pattern-pins pass in succession beneath the pin $g^2$. As each pattern-pin $h$ stops beneath pin $g^2$, the disk H″, with its pins, is raised, and always to a certain height. At each elevation of the disk H″ the frame $G^5$ will be lifted to an extent which depends upon the length of the pattern-pin then under the pin $g^2$, and as the frame $G^5$ is lifted it raises with it the rod G‴, before described, which turns the lever G′, which moves the sliding bar $b'$, and determines which shuttle-box shall be brought into line with the shuttle-race, as before described. There are of course as many lengths of pins as there are cells in the change shuttle-box—in this case six. The foot of the frame $G^6$ rests upon the arm $G^7$ of the lever $G^4$, before described, the said lever having a second arm, $G^8$, provided with a roll, $g^4$, which bears against the face of a cam, I, fast upon the main cam-shaft A′, the said cam, as it revolves, moving the lever $G^4$, raising and lowering the frame $G^6$, and with it the shaft H′ and pattern-disk H″ and the pattern-pins.

It will be seen hereinafter that the pattern-disk is not advanced so long as it is kept near its uppermost position. How it is thus kept when a rest of greater or less extent is required, in order that the shuttle in the box corresponding to the length of pattern-pin, then operative, may be used for more than two picks, will now be explained.

Figure 15:
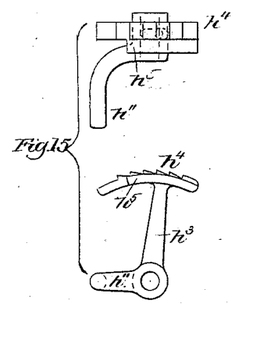

Upon the bar H is a second frame, $G^8$, which slides but does not turn thereon. This frame $G^8$ at its top has a pin, $g^5$, which is placed over the line of the outer circle of pattern rest-pins $h'$ in the pattern-disk. The lower end of this frame $G^8$ has a jaw, in which fits the end $h^2$ of a ratchet-lever, $h^3$, (shown separately in Fig. 15,) mounted on a stud, $g^6$, projecting from one side of the frame $G^6$, and having upon its upper curved end at one side a series of ratchet-teeth, $h^4$; and at the side of the teeth a shaped or notched plate, $h^5$. When the frame $G^6$ and the pattern-disk H″ are lifted, the frame $G^8$ is also raised by one of the pattern rest-pins, $h'$, to a greater or less distance, according to the length of the pattern rest-pin, which is under the pin $g^5$.

Figure 16:
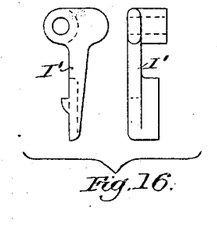
Fig. 16, details of the suspending-hook.
Figure 17:
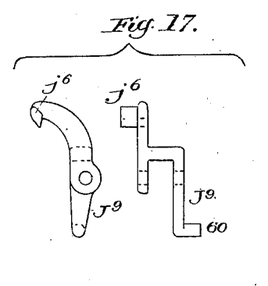

Suspended upon the pin $a''$, which is fast to an ear, $A^5$, of the loom side, (see Fig. 3,) is a hook, I′, (shown separately in Fig. 16,) which catches when opposite to it upon the under side of the plate $h^5$ of the lever $h^3$. When this hook I′ is caught upon the notched plate $h^5$, the frame $G^6$ and the pattern-disk are held up by it and do not follow the arm $G^7$ as the latter swings downward. Each stroke of the pawl $i$, which is pivoted to the pin $i'$ on the arm D′, moves the ratchet $h^4$ one tooth to the right; and when the end of the plate $h^5$ passes from under the hook I′, the frame $G^6$, being at this time in contact with the arm $G^7$, follows the latter in its downward movement, the shaft H′ and pattern-disk supported thereby descending with it. The pattern-disk, having been brought to its lowest position, is then advanced one space, in a manner to be hereinafter explained.

It will be noticed that there are two means of moving the lever $h^3$—one by the action of the pattern-pins through the frame $G^8$ and the arm $h''$ of the ratchet-lever $h^3$, and the other by the working of the pawl $i$, as just described, so that whatever the former fails to do in carrying the notched plate clear of the hook I′ the pawl will accomplish. If the sliding frame $G^8$ is lifted by one of the longest of the pins $h'$, the lever $h^3$, and its plate $h^5$ will be swung so far to the right in Fig. 3 that one stroke of the pawl will complete its release from the suspension-hook I′; but if one of the shortest pins is employed it will take six strokes of the pawl to complete the release of the said plate from the said hook. As each stroke of the pawl takes place only at each revolution of the main cam-shaft of the loom, or at every two picks of the loom, it follows that there may be a rest of the pattern-disk for any even number of picks, not exceeding twelve, depending upon which of the different lengths of pin is operative. Each pick puts in one thread of filling.

The pin $i^2$ (see Figs. 1 and 2) on the swinging frame D is made to lift the pawl $i$ at the proper time, so that it may not, as the frame $G^6$ moves, catch upon the teeth $h^4$ and prevent the lever $h^3$ from turning more or less toward the left on its fulcrum $g^6$.

Figure 14:
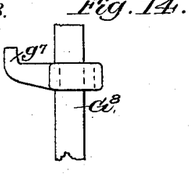
Fig. 14, a detail in front elevation of the sliding frame G$^8$ (to be referred to) and its horn.

Fastened to the uppermost ear, $A^3$, before referred to, is a flat spring, $i^3$, (see Fig. 3, and dotted lines, Fig. 4,) which bears against the sliding frame $G^8$, and holds it in place wherever it shall be left, instead of allowing it to fall by its own weight. The horn $g^7$ on the frame $G^8$, (see Figs. 4 and 14 and dotted lines, Fig. 3,) is struck by the plate $h^5$ as the latter descends, thus carrying the frame to its lowest position. The lever J, having its fulcrum upon the stud $j$, fast upon the loom side and operated by the cam J′, attached to the crank-shaft A″, carries at its upper end, on the stud $j$, a pawl, J″, which imparts a step-by-step rotary movement to the pattern-disk. The pawl J″, on its lower side, has a spur, 17, to which is attached the spring $j^2$, connected at its other end with an eyebolt, $A^6$, fast in an ear on the loom side. The spur 18 on the upper side of the pawl J″ is drawn by the spring $j^2$ against the projection $A^7$ on the loom side when not kept away from it by the action of the cam J′. The left-hand end of the pawl (see Fig. 3) bears upon a stop, $A^8$, on the loom side, which acts to prevent the right-hand end of the said pawl from rising beyond a certain point. When the pattern-disk approaches its lowest position, (it being shown in the drawings as in its highest place,) the plate $h^9$ drops upon the right-hand end, Fig. 3, of the pawl J″, so that the upturned end of the latter catches into a space between adjacent teeth $h^6$ at its lower side. When the pawl J″ moves to the right it turns the plate $h^9$ and pattern-disk one space, bringing other pattern-pins under the pins $g^2$ and $g^5$ of the sliding frames. The teeth $h^6$ are square on both sides, as is also the point of the pawl J'', which catches between them, thus enabling the pawl to serve not only to move the disk, but to prevent it from going too far. To hang the pawl so that its upturned end will not be disengaged from between the teeth $h^6$ when its stroke has been completed, and thus permit the pattern-disk to overrun, has been a matter of some difficulty, but has been accomplished by providing the pawl with the spur 18 and the frame with the projection $A^7$, their point of contact being above the point of the said pawl, for as soon as the spur 18 meets the stop, the disk having been fully moved, the strain on the pawl acts to press its end into the space between the teeth $h^6$ with greater force. The return-stroke of the pawl is taken when the teeth of the plate are lifted clear from the pawl.

At the top of the frame $G^6$ is a stud, $h^7$, upon which swings a detent, $h^8$, which is kept pressed against the peripherical teeth of the plate $h^9$ (see Fig. 5) by the spring $i^4$, attached to the adjustable collar $i^5$, which detent serves to bring the plate $h^9$ and the pattern-disk H'' exactly into place, where they are held while the pawl J'' is not operating to move the pattern-disk.

Having described the pattern-disk with its two rows of pins, I will now describe its operation.

The pins $h$ of the inner row determine which of the cells of the change shuttle-boxes shall be worked from time to time, and those $h'$ in the outer row how long the pattern-disk shall rest at the different points. The greatest difficulty heretofore experienced in the use of a pattern disk or wheel moving always uniformly onward in the same direction has been that it was necessary that the patterns of cloth to be woven should be limited to such as contain a number of filling-threads corresponding to the number of pins or spaces in the circumference of the pattern-wheel, or to patterns which contained a number of filling-threads, by which the number of threads corresponding to the full number of pins would be evenly divided. This has led to the use of pattern-chains, which, however cumbrous and inconvenient, may be made up so as to give any required length for the pattern; but in my arrangement the progress of the pattern-disk depends upon the various lengths of the pins put into the outer row of holes in the pattern-disk. I have provided the pattern-disk with two rows of holes—fifty-six in each. If in the outer row the shortest pins only are used, there will be a rest for twelve picks at each one of these pins, or six hundred and seventy-two picks will be made before the disk gets around and the pattern is completed. If only the longest pins are used in the outer row, there will be a rest for only two picks at each pin, or one hundred and twelve picks will be made at a round of the disk. For a pattern requiring less than one hundred and twelve picks, the pins properly set for the pattern will be repeated two or more times. A pattern will ordinarily require different rests at different points; but the progress around the whole disk may within the limits of the capacity of the apparatus be more or less rapid, at pleasure. The use of the horizontal disk with the vertical pin-holes, into which the pattern-pins may fit so loosely as to be easily put in and taken out in changing the pattern, while the force of gravity keeps them from falling out, and the giving to the whole a vertical movement, so that there shall be simply an end pressure upon the pins, makes a combination of peculiar excellence. When the filling breaks, it is necessary to stop the pattern mechanism. The bar $J^3$ is moved back and forth by an arm, 19, (see Fig. 9,) of a rock-shaft, 20, supported in bearings below the breast-beam 21, the said shaft at its other end having an arm, 22, which in practice bears against the rear end of the sliding bar of any usual filling-fork. The bar $J^3$ is supported upon the stud $J^4$, fixed to the loom side, and when the filling breaks and the filling-fork causes the shaft 20 to be turned, the bar $J^3$ is moved to the right in Fig. 3, and its inclined end runs upon the pin 23 at one end of the lever $J^5$, (see Figs. 3 and 21,) and the weight of the bar $J^3$, being thus transferred from the stud $J^4$ to the lever $J^5$, the latter is depressed and swung about the fixed stud $j^3$. The lever $J^5$ has two spurs, $J^6 J^7$. The spur $J^6$, when the lever $J^5$ is moved, as just described, catches upon the lower end of the lever J and prevents it from swinging to turn the pattern-disk, and at the same time the stud $J^7$ lifts the pawl $i$, so that it will not move the lever $h^3$. The lower right-hand end of the bar $J^3$ is connected with the bar $J^8$ by the pin $j^4$. The right-hand end, Fig. 3, of the bar $J^8$, made V-shaped, as shown, engages the projection 60 at the lower end of the arm $J^9$, (see Fig. 17,) which swings upon the pin $j^5$, carried by an ear of the frame $G^6$. (See Fig. 3.) The upper end of arm $J^9$ has a hook, $j^6$, which may be swung to catch upon the teeth of the ratchet $h^4$, which being thus caught will not move under the suspension-hook I'. In these ways the pattern mechanism is prevented from making any progress when the filling is out.

The outer guide, in which the change shuttle-boxes slide has heretofore been supported by some sort of a frame projecting from the lay near the line of the shuttle-race. This projecting frame has had to meet its outer end, and unaided withstand severe vertical and horizontal strains, and has also been depended upon to keep the outer guide from twisting out of parallelism with the inner guide. The guides to direct the movements of the change shuttle-boxes require to be very stiff; yet, as increase of weight is decidedly objectionable in a piece having so much motion as the lay, I have had to devise means other than the weight of the metal alone for stiffening the parts. In this my invention I have made the outer guide for the change shuttle-boxes at the outer end of an arm connected as usual with the lay near the shuttle-race, and I have made the said frame only sufficiently heavy to take the backward and forward strain; and to overcome the twisting of the guide in any direction, I have extended its lower portion downward, as shown in Fig. 6, and have connected it with an extension of the lay rock-shaft, which has very little movement, and may therefore be made as heavy and stiff as desired, this extension of the slide also acting as a brace to support the slide and the outer end of the frame to which it is bolted.

Figures 6, 23, 24:
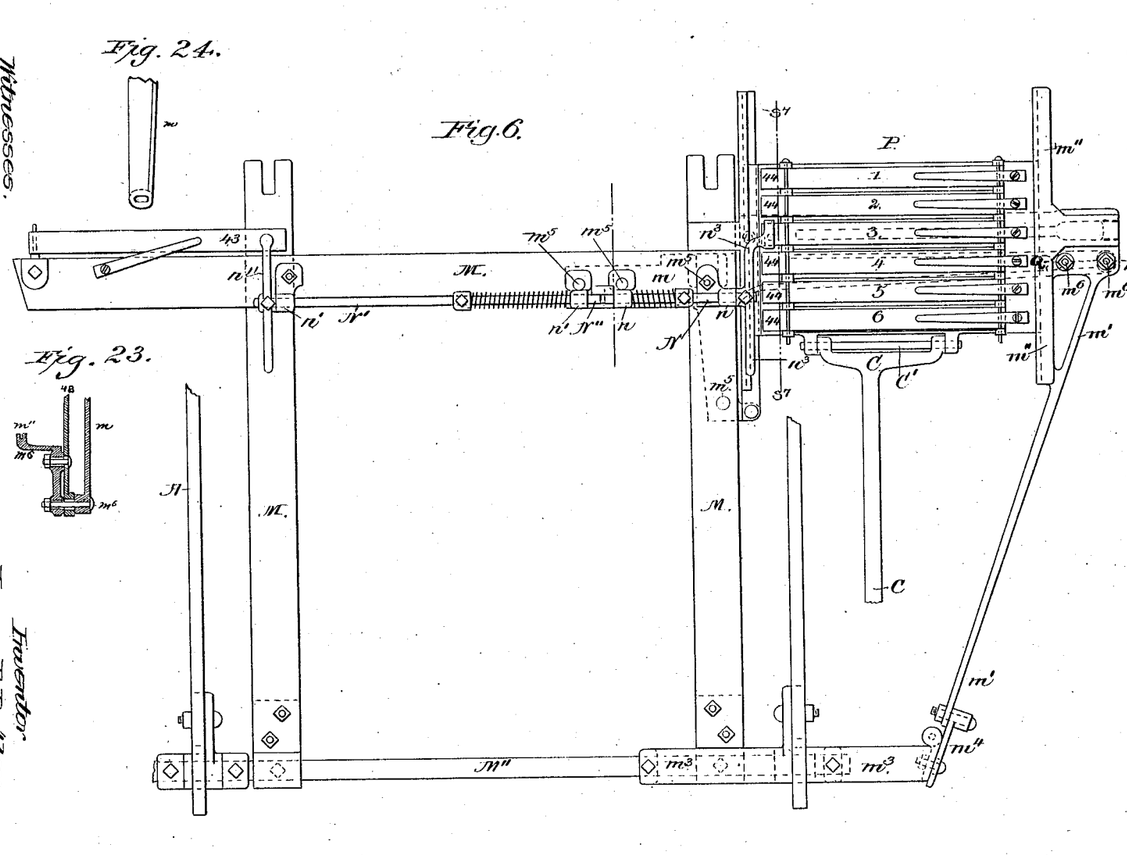
Fig. 6, a detail of the lay, change shuttle-boxes, and their guides, and some of the parts carried by the lay.
Fig. 23 is a sectional detail on the dotted line P Q, Fig. 6.
Fig. 24, a detail showing the slotted outer end of the bracket $m$.
Figures 7, 8, 9, 10, 11, 12:
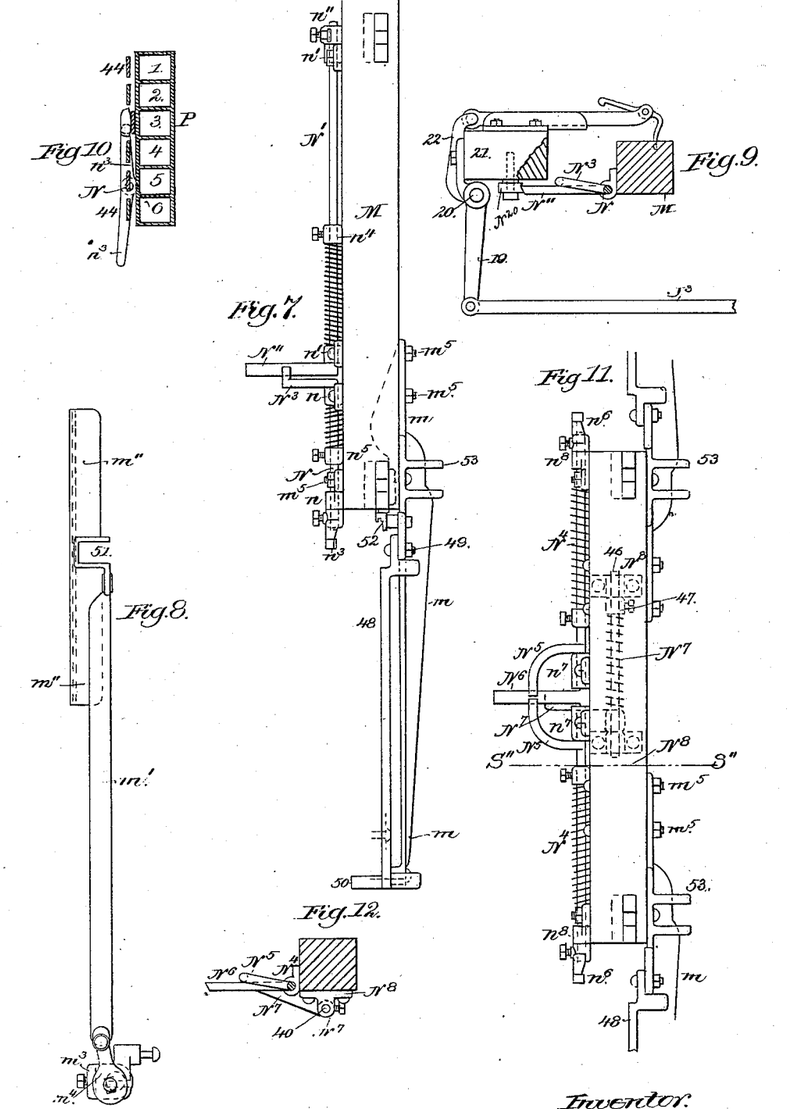
Fig. 7 is a plan view of Fig. 6 with the shuttle-boxes, binders, picker-sticks, and guide $m'''$ omitted.
Fig. 8, a detail in end view of the outer guide, in which the shuttle-boxes slide, together with its brace.
Fig. 9, a sectional detail of the breast-beam and the lay, to illustrate the operation of the protecting mechanism, other parts of which are shown in Figs. 3, 7, and 11.
Fig. 10 represents in sectional detail the presser-finger, and catch, and shuttle-binders, and shuttle-boxes.
Fig. 11 represents an arrangement of protecting devices which is employed where change-boxes are used on both sides of the loom.
Fig. 12, a section through the line S'' S'' of Fig. 11.
Figure 13:
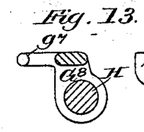
Fig. 13, a section of the parts H and G$^8$ on the line S$^{10}$, Fig. 3, looking down.

In Figs. 6, 7, and 8, M is the lay; M'', the lay rock-shaft; $m$, (see Fig. 7,) the bracket projecting from the shuttle-race beam; $m'$, the brace; $m''$, the outer guide, in which the change shuttle-boxes slide; $m^3$, an extension-frame from the rock-shaft, and $m^4$ an adjustable foot connecting $m'$ and $m^3$. The bracket or frame $m$ is connected to the lay by the bolts $m^5$, and to the brace $m'$ by the bolts $m^6$. The frame $m^3$ may be slid back and forth on the rock-shaft, to which it is fastened by set-screws, and the stand $m^4$ set as desired, thus affording an opportunity to adjust and to firmly hold the guide $m''$ in any position required. The bracket $m$, near the sword of the lay, has a stiff metal plate, 48, bolted to it, (see Fig. 7,) by a bolt, 49, and the outer end of the said plate has an end piece, 50, which enters a notch, 51, formed at the rear side of the outer guide, $m''$, (see Fig. 8,) the said end piece being shown by the heavier dotted lines at the extreme right-hand edge of Fig. 6. The outer end of the bracket $m$ is slotted, (see Fig. 24,) and the outer end of the metal plate 48 is also slotted, (see Fig. 23,) to receive the bolts $m^6$ $m^6$, one of which is extended through a slot in the outer guide, $m''$, and slots in the said plate and bracket, as in Fig. 23, while the second bolt $m^6$ is extended only through slotted holes in the said bracket and the metal plate 48, the said bolts and slots thus permitting the outer guide to be adjusted in proper vertical position with relation to the other parts of the loom, or the inner guide marked 52.

Of course the details may be considerably varied while yet retaining the essential features of my invention.

Convenience may sometimes lead to placing the lower frame a greater or less distance from the line of the shaft, though the nearer it can be put to this line the better will be the effect.

In the working of change shuttle-box looms there has heretofore been a constant danger of the shuttle being caught in the warp under conditions in which the protecting mechanism will not operate to stop the loom and save the warp. For example, it sometimes happens, owing to the breakage of the picker stick or strap or from other causes, that a shuttle is not thrown from but remains in the single box, and when the change-box shifts and another shuttle is thrown from it across the loom, this shuttle cannot enter the single box because of the other one remaining in it, but is stopped between the reed and the warp-threads, breaking the latter as the lay beats up. It also sometimes happens that the change shuttle-boxes shift by accident, owing to irregular working of the box motion after a shuttle has been thrown from one of them, and the shuttle last thrown, in returning, strikes against the shuttle, which in the change-box has come improperly into line with the race-plate of the lay, and is caught in the warp while yet the loom continues running. I have made provision to meet these difficulties, as I will now describe, referring to Figs. 6, 7, 9 and 10. I employ two shafts, N and N', which swing, respectively, in their bearings $n$ and $n'$, fast to the beam of the lay. To the shaft N' are fastened the dagger N'' and the finger $n''$, the latter bearing against the shuttle-binder 43 of the single box. To the shaft N at the other end of the lay is fixed the arm N³, the end of which bears upon the top of the dagger N'', and also the finger $n^3$, which bears against the binders 44, as will be described, of the change shuttle-boxes as they come opposite to it. The collars $n^4$ and $n^5$ and the spiral springs attached to them tend to swing the two shafts, so as to keep the fingers $n''$ and $n^3$ against their respective shuttle-binders. The top of the finger $n^3$ projects so that it may be fall between and catch against the shuttle-binders of the change shuttle-boxes above and below it, (see Fig. 10,) when the cell opposite the said finger and shuttle-race is empty. The catching of the finger $n^3$ between the binders, the finger having a projection or hook thereon at its inner side, to act upon the binders above and below the binder on which the finger presses, prevents the shifting of the change-boxes until the shuttle thrown from the box across the loom has returned to it again. If the shuttle-boxes occupy their lowest position, the projection or hook acts upon the binder of only the top box of the series, and vice versa. The engagement of the point of the hooked finger with the edges of the binders of the change shuttle-boxes will prevent the shifting of the change-boxes until the said hooked finger is swung out by the return to the cell of the shuttle-box opposite the lay shuttle-race, and opposite to the point of the hooked finger of the shuttle last thrown across the loom.

It being essential to my invention to have the hooked finger on the change-box side of the loom swung back only by the operation of the shuttle-binders of the change-boxes, the said hooked finger must not be fastened to the shaft which is swung by the finger-bearing against the binder of the single box, but must as shown, be on a separate shaft, for otherwise the presence of a shuttle in the single box would disengage the hooked finger from the change shuttle-boxes, and, allowing these boxes improperly to shift, would entirely defeat the object of the invention.

The mechanism hereinabove described absolutely prevents two shuttles being at the same time on the line of the race-plate, and hence no collisions can occur to cause the breakouts above described.

By placing the dagger $N''$ and finger $n^3$ upon different shafts having fingers pressed against the binders by springs held on the said shafts, and placing the finger $n^3$ on top of the dagger, it will be understood that the latter cannot rise sufficiently to strike the usual lever, $N^{20}$, pivoted upon the under side of the breast-beam and cause it to release the shipper-handle, so long as the binders immediately opposite either of the fingers $n''$ $n^3$ are pushed outward by shuttles in the boxes; but should the binders opposite the fingers $n''$ $n^3$ not be held out, then the springs on the shafts carrying the said fingers will act to effect the ascent of the dagger and stop the loom.

A modification of the mechanism just described—such as is required when change-boxes are used on both sides of a loom—is shown in Figs. 11 and 12. The two fingers $n^6$ are each attached to a shaft, $N^4$, which swings in bearings $n^8$ $n^7$, extending half-way through the latter, and each has an arm, $N^5$, the end of which bears against the top of the dagger $N^6$, which in this instance has a shaft extending from it on both sides, and turns in the two bearings $n^7$, going half-way through each. The end of the spiral spring $N^7$ presses against the under side of the dagger. This spring is coiled upon the shaft 46, held in bearings, as shown, and is set by turning on this shaft the collar 47, to which the spring is attached. The ears 53 receive between them the usual links, which join the lay with the crank-shaft.

To prevent the frame D moving so far upward that the spur $d^3$ of arm D' will not re-engage the catch $d^2$, I have provided the frame D, at its lower end, with a lateral prong, 54, (shown best in Fig. 2,) which strikes against the hub of the cam $D^3$.

I am aware that a shuttle-box lever has been swung about its axis by means of a link connected with a lever carrying a sliding block, the position of which on the said lever is determined by a pattern-surface, the said block having a spur, which is engaged by notched arms having fulcra different from each other, and from that of the shuttle-box lever, and from that of the lever on which the block referred to is placed to slide. In my invention the shuttle-box lever and the levers which act upon the slide-box have the same axis, and, because of having the same center, sliding of the said parts on each other while shifting the box is obviated.

A sliding plate moved by a pattern-surface and having a double series of notches has been engaged by two claws having the same center of motion as the shuttle-box lever; but in such contrivance the strain exerted through the pattern mechanism to move the sliding plate is very considerable, the plate being necessarily much heavier than the bar $b'$ employed by me. As the checking of the shuttle-box lever without jar is a matter of considerable difficulty, it will be seen that any extra or unnecessary weight carried by the said lever becomes very objectionable.

I claim—

1. A change shuttle-box, shuttle-box lever provided with guides, means to connect the shuttle-boxes and shuttle-box lever, a bar, $b'$, sliding in the guides on the shuttle-box lever, and suitable means to slide the said bar, combined with the arms E E', having their axes of motion coincident with that of the shuttle-box lever and adapted to engage with the ends of the said bar $b'$ on opposite sides of the fulcrum of the shuttle-box lever, the said arms E E' being provided with steps to engage the said sliding bar, and means to move the arms E E', substantially as shown and described.

2. The lay, the change shuttle-boxes, shuttle-box rod, shuttle-box lever provided with guides, slide-bar $b'$, carried in the guides of the shuttle-box lever, and means to move the said slide-bar, combined with the two arms E E', having heads provided each with a series of steps corresponding in number with the number of cells in the shuttle-box, and having their axes of motion coincident with that of the shuttle-box lever and adapted to engage with the ends of said bar on opposite sides of the fulcrum of the shuttle-box lever, and with connecting-rods, a swinging frame with which said heads are joined by said rods, and means for operating said frame and causing the same to move the said heads positively in unison, whereby a step of one head engages one end of the bar, and then a step of the other head, holding the bar equally at each end, and locking the shuttle-box lever when the shuttle-box to be used is opposite the lay-race, substantially as described.

3. The shuttle-box lever and the slide-bar carried on it, the lever G' and rod G'', combined with sliding frame $G^5$, and pattern mechanism, and suitable means to lift the pattern mechanism as described, whereby the said bar is moved on the shuttle-box lever, substantially as described.

4. The shuttle-box lever, its slide-bar $b'$, provided with arms 8 7 and combined with the lever $G^3$, spring to hold it, and the lever G', rod G'', sliding frame $G^5$, pattern-surface, and means to lift said pattern-surface to raise the said frame, substantially as described.

5. The cam $l$, means to move it, the lever $G^4$, and spring $g''$, combined with the lever $G^3$, the sliding bar $b'$, provided with arm 7, and the shuttle-box lever, substantially as described.

6. The arms E E', the swinging frame D, provided with the pivoted catch $d''$, and the connecting-rods $d^3$ $d^9$, attaching both of the said arms to the said frame, combined with the arm D', provided with a tooth, $d^3$, the spring $d^4$, the cam to move arm D', and with means to move the said cam, whereby both of the said arms E E' are moved or stopped in unison, substantially as described.

7. The arm D', provided with the tooth $d^3$, the cam $D^3$, and means to move it, combined with the swinging frame D, its catch and spring $d^4$, and prong 54, to limit the movement of the said frame in one direction, substantially as described.

8. The shuttle-box lever, the bar $b^6$, provided with the spur $b^7$, and the lever $X^4$, provided with the spur 10, and means to move the last-named lever, as described, combined with the arms having segmental heads, and provided at their outer sides with notches to be engaged by the said spurs, means to move the arms provided with the segmental heads, and means between the said heads and shuttle-box lever, to operate the latter, substantally as described.

9. The shuttle-box lever, the bar $b^6$ thereon and its attached lever $X^4$, having arm $b^8$, the lever F, and the spring to hold it against the lever $X^4$, combined with the arms E E', having segmental heads, suitable means to operate them, and with means whereby the shuttle-box lever may be operated by the said heads, substantially as described.

10. The shaft H', its pattern-disk provided with pins, and means to rotate and lift the said shaft and disk, combined with the frame $G^5$, its pin $g^2$, the connected rod G'', the shuttle-box lever, the slide-bar mounted thereon, and means between the rod G'' and said slide-bar to move the latter, substantially as described.

11. The change shuttle-boxes, the shuttle-box lever, means to connect them, the slide-bar $b'$, lever G', rod G'', means to move the slide-bar in opposition to the lever G', and to engage the said bar to move the shuttle-box lever, the sliding frame $G^5$, and pin $g^2$, slide-frame $G^8$, its pin $g^5$, the lever $h^3$, frame $G^6$, pawl $i$, and means to move it, and the hook I', combined with the pattern-disk, having two series of pins $h\ h'$, the shaft H', and means to rotate the said pattern-disk and shaft and lift frame $G^6$, substantially as described.

12. The sliding frame $G^6$, means to move it, the lever $h^3$, pivoted thereon, and the frame $G^8$, with which the said lever is connected, means to move the frame $G^8$, and the hook I', engaging the plate $h^5$ of the lever $h^3$, combined with the pawl $i$, and means to move it, substantially as described.

13. The pattern-disk H'' and plate $h^9$ below it, combined with two series of pins, $h\ h'$, inserted in the said disk H'', and supported at their lower ends by the plate $h^9$, substantially as described.

14. The shaft H', means to rotate it, the pattern disk and pins, the sliding frame $G^6$, and means to lift it, the lever $h^3$, attached thereto, and having the plate $h^5$, and suitable means to connect the said lever with the said pattern-disk, combined with the hook I' and the pawl $i$, and means to move the said pawl to engage the ratchet-teeth of the said lever $h^3$, substantially as described.

15. The pattern-disk, its shaft H', and the plate $h^9$, provided with teeth $h^6$, the pawl J'', provided with spur 18, and means to move the said pawl longitudinally, combined with the projection $A^7$, to operate substantially as described.

16. The shaft H', the pattern-disk, the plate $h^9$, provided with teeth $h^6$, the pawl J'', lever J, stop $A^8$, and projection $A^7$, combined with the spring $j^2$, and means to operate the lever J, to move the pawl, substantially as described.

17. The cam J', means to move it, the lever J, the pawl J'', pivoted thereon, combined with the stop $A^8$ and $j^2$, substantially as and for the purpose described.

18. The arm D', means to move it, its connected pawl $i$, and the lever $J^5$, provided with spurs 23 and $J^7$, combined with the bar $J^3$ and means to move it to turn the lever $J^5$ and lift the pawl $i$, substantially as and for the purposes set forth.

19. The bar $J^3$, means to move it, as described, the hook-bar $J^8$, and the lever $J^9$, provided with catch $j^6$, combined with the frame $G^6$, means to lift it, the hook I', and the ratchet-toothed lever $h^3$, substantially as described.

20. The cam I, means to rotate it, the lever $G^4$, having the arms $G^8\ G^7$, combined with the frame $G^6$, and its attached shaft H', and guide for the said frame, substantially as described.

21. The shuttle-box lever, its slide-bar $b'$, provided with arms 8 and 7, combined with the lever $G^3$, spring $g''$, to hold it, the lever G', rod G'', sliding frame $G^5$, pattern-surface, means to lift it to raise the said frame, and with the lever $G^4$, and means to move it, substantially as described.

22. The lay having the bracket $m$ connected therewith rigidly, the plate 48, and the adjustably-attached outer guide, $m''$, provided with the downward extension $m'$, permanently secured to the lower end of the said guide, combined with the rock-shaft of the lay, and means to connect it with the said extension, to hold the guide from twisting or turning, substantially as described.

23. The lay and change shuttle-boxes, the series of binders, and suitable means to lift the shuttle-boxes, combined with the shaft N, a spring, and a finger provided with a projection or hook adapted to catch upon the edges of the binder or binders adjoining the binder on which the finger presses, to prevent the shuttle-boxes from being shifted, the said finger being swung to release the shuttle-boxes through the action of the binder, substantially as described.

24. The lay, change shuttle-boxes, suitable means to operate them, the binders, the hooked finger co-operating therewith, as described, the shaft and spring to keep the finger pressed against the said binders, and the arm $N^3$, combined with the binder 43, the finger $n''$, rod $N'$, the spring thereon, and dagger $N''$, whereby the hooked finger will prevent the shifting of the change-boxes until swung out by a binder, and whereby the binder at the single box end of the lay may operate to lower the dagger while yet permitting the hooked finger to remain in locking engagement with the series of change-boxes to prevent the shifting of the change shuttle-boxes until the return of the shuttle last thrown into its cell in the series of change-boxes, substantially as described.

25. The combination of the lay, change shuttle-boxes, suitable means to move the boxes, and the series of shuttle-binders, with the shaft N, its hooked finger to catch upon the binders, the spring on the said shaft, the finger $n^3$ to act upon the dagger, and a dagger and a shaft and spring to operate it, substantially as described.

In testimony whereof I have signed my name to this specification in the presence of two subscribing witnesses.

JAMES D. BUTLER.

Witnesses:
G. W. GREGORY,
B. J. NOYES.